United States Patent Office 2,992,185
Patented July 11, 1961

2,992,185
AQUEOUS EMULSION CONCENTRATE FOR USE IN CONDITIONING AUTOMOBILE COOLING SYSTEM LIQUIDS
Edward Roy Taylor, Jr., Springfield, Pa., assignor to E. I. du Pont de Nemours and Company, Wilmington, Del., a corporation of Delaware
No Drawing. Filed Sept. 19, 1957, Ser. No. 684,846
10 Claims. (Cl. 252—76)

This invention relates to combination anti-rust/lubricant compositions for use in conditioning the liquid cooling system of an automobile and, more particularly, to aqueous emulsion concentrates which on multi-fold aqueous dilution in an automobile cooling system provide anti-corrosion and anti-acid protection, and lubrication to moving parts exposed to the aqueous liquid in the system.

The use of borax, $Na_2B_4O_7.10H_2O$, and other water-soluble alkali metal borate salts as corrosion inhibiting agents in the aqueous heat exchange liquid of an automobile cooling system is well known in the art. For example, U.S. Patents 1,911,195, 2,384,553, 2,388,155 and 2,534,030 relate to anti-freeze compositions containing a small proportion of soluble borate salts to provide anti-corrosion protection. U.S. Patent 2,566,923 relates to a single phase anti-rust concentrate in which the mixture of soluble corrosion inhibitors includes alkali-metal borate salts.

Commercially available anti-rust concentrates for use as cooling system additives frequently contain a water-insoluble lubricant for lubrication of any moving parts in contact with the aqueous heat-exchange liquid. Mineral oils generally are used as the lubricant and inasmuch as this type of lubricant is water-immiscible, the combination anti-rust/lubricant concentrate ordinarily is in the form of an emulsion having the lubricant dispersed in an aqueous phase which may or may not contain water-soluble corrosion inhibitors and alkaline buffering salts for anti-acid protection. Emulsions are unattractive products unless the lubricant either remains stably dispersed in the aqueous phase or is readily redispersed by mild shaking or agitation. From a manufacturing standpoint it is important that the emulsion is substantially stable in order that the composition remains uniform during packaging operations. One or more emulsifiers or surfactants are included in the aqueous compositions to facilitate dispersing the lubricant and stabilizing the resulting emulsions.

Although mineral oil-containg cooling system protective compositions have found wide customer acceptance, the presence of the mineral oil lubricant in the coolant has a particularly adverse effect on rubber components of the cooling system. Rubber is readily attacked, softened and made tender by mineral oil lubricants and the deterioration of radiator connecting hoses and other rubber transmission lines for the aqueous heat-exchange fluid of the automobile by the mineral oil is accelerated due to the high temperature at which the fluid is maintained.

This deficiency of mineral oil is well recognized and lubricants which do not attack rubber are continuously being sought. Polymeric polyoxyalkylene glycols and lower alkyl ethers thereof have been found to be excellent lubricants which do not attack rubber. U.S. Patent 2,757,142 describes lubricating, corrosion-inhibiting concentrates of the liquid and particulate solid types useful as additives for protectively conditioning the aqueous fluid of an automobile cooling system.

Utility of castor oil as a water-insoluble lubricant is well known and the inertness of castor oil in reference to rubber softening and deterioration under ordinary operating conditions of the automobile cooling system is well noted. However, heretofore, it has not been found possible to stably disperse castor oil in an aqueous concentrate containing dissolved alkaline borate salts and supplementary inhibitors in sufficient amount to provide adequate anti-corrosion and anti-acid protection when the concentrate is diluted in the ordinary proportions of from 20 to 60 parts of final volume per part of the concentrate. These dilution proportions correspond to the addition of from 12 to 16 fluid ounces of concentrate to the cooling system of an automobile having a capacity of from about 10 quarts to about 22 quarts of aqueous heat-exchange liquid.

Castor oil is a recognized emulsion breaker and therefore utility of this lubricant in cooling system additives is dependent on stably dispersing the castor oil in water in the presence of significant concentrations of electrolyte salts. Innumerable ionic emulsifiers and non-ionic surfactants of various types have been found to be ineffective in counteracting the emulsion-breaking characteristics of castor oil.

The primary object of this invention is to provide a castor oil-dispersant combination which nullifies the emulsion-breaking characteristics of castor oil and enables the preparation of stable aqueous emulsions of castor oil in the presence of significant concentrations of water-soluble electrolyte salts. A more specific object of the invention is to provide a stable lubricating, corrosion-inhibiting, anti-acid aqueous emulsion concentrate having a dispersed oil phase comprising castor oil as the lubricant and having an aqueous phase comprising water, at least one water-soluble borate salt and a water-soluble source of chromate ion, the concentration of castor oil, borate salt and chromate ion source compound being sufficient to provide effective concentrations of lubricant, corrosion-inhibitor and alkalinity reserve for anti-acid protection on 20 to 60 fold aqueous dilution of the concentrate. Another object is to provide a method of stably dispersing castor oil in water in the presence of dissolved borate salts and a chromate ion source compound in amounts at least 60 times the respective amounts which provide effective anti-corrosion and anti-acid protection and effective lubrication when included in an aqueous heat-exchange liquid of an automobile cooling system.

These objects are accomplished by forming an aqueous solution of (a) from about 5% to about 12% of at least one water-soluble alkali metal salt of boric acid, (b) an amount of a water-soluble source compound for chromate ion corresponding from about .1% to about 1.% of $CrO_3$, and (c) an amount of water sufficient for the sum of $(a)+(b)+(c)$ to total at least 72% by weight of the final product and homogeneously dispersing in the resulting aqueous electrolyte salt solution as an oil-phase (d) from 3% to 20% of castor oil and (e) a liquid self-emulsifying oil-soluble ricinoleate ester which is a complex esterification product of from 2 to 3 mols of ricinoleic acid per mol of a polyoxyethylene glycol having an average molecular weight of from about 250 to about 500, the ester being present in the proportion of from .25 part to .4 part of the ester per part by weight of the castor oil.

The described self-emulsifying ricinoleate ester is soluble in castor oil, supplements the lubricating activity of the castor oil, and is effective in nullifying the emulsion-breaking properties of castor oil. This complex ricinoleate ester can be prepared by esterifying a polyethylene glycol having an average molecular weight of from about 250 to 500, preferably about 400, with ricinoleic acid in the proportions of from 2 to 3 mols, preferably from 2.3 to 2.7 mols, of the acid per mol of the polyoxyethylene glycol. The resulting ester products are complex because the ricinoleic acid, also known as 12 hydroxy-9-octadecenoic acid, contains a reactive hydroxyl substituent competing with the hydroxyl substituents of the glycol in the esterification reaction. Complex ricinoleate esters of this type are commercially available, one source being polyethylene glycol 400 (Di-Tri) ricinoleate S556U supplied by Glycol Products Co., Inc. This product is characterized as follows:

| | |
|---|---|
| Specific gravity at 25° C. | 0.96 |
| Solidification point | −10° C. |
| Acid value | Less than 12 |
| Free fatty acid content | Less than 6% |
| Saponification value | 164–168 |
| Iodine value | 75–85 |
| pH–5% aqueous dispersion | 3.5–4.5 |

Although sodium tetraborate or its decahydrate, borax, and potassium tetraborate can be used as the borate salt component of the emulsion concentrate to provide satisfactory anti-corrosion protection, it is desirable to provide greater alkalinity reserve for anti-acid protection. During operation of the internal combustion engine, acidic combustion products sometimes contaminate the aqueous heat-exchange liquid to render it acidic with the result that the rate of corrosion is accelerated. In order to provide a desired alkalinity reserve for neutralization of contaminating acidic combustion products it is preferred that borate salt has a composition corresponding from about .7 mol to about .85 mol of $K_2O$ per mol of $B_2O_3$. These proportions also can be obtained by mixing appropriate amounts of the tetraborate salt ($K_2B_4O_7$) either with the metaborate salt ($K_2B_2O_4$) or with alkali. The borate salts are preferably formed in situ by reacting orthoboric acid with alkali, preferably potassium hydroxide, in aqueous solution. The borate reaction product can be present in the invention concentrate from 5% to 12%, preferably 6% to 10%, based on the total weight of the composition. The potassium borate salts are preferred because they are more soluble in water and do not readily salt-out from the aqueous phase when the concentrate is subjected to atmospheric temperatures below 32° F.

Sodium borate salts corresponding to the indicated preferred proportions of alkali and orthoboric acid can be used at concentrations up to about 8% based on the weight of the concentrate. Higher concentrations of the sodium salts present solubility problems. Sodium borate salts which are salted out of solution in the concentrate are difficult to redissolve. Concentrations of potassium borate salts up to 12% by weight are not salted out as a result of ordinary fluctuation in atmospheric temperature. Any potassium borate salts separated from the concentrate are easily restored to solution by mild agitation after the concentrate is restored to a temperature above the salting out temperature. When sodium salts are included with potassium salts in the concentrate, the content of the sodium salt preferably is present in an amount no greater than that of the potassium salt.

Ammonium borate salts also are operative in preparing stable concentrates. Such concentrates used in an automobile cooling system ordinarily do not provide adequate anti-corrosion protection for copper and high-copper containing alloys. This type of composition provides satisfactory protection when copper and higher copper alloys are not included with the metals exposed to the anti-corrosion conditioned heat-exchange liquid.

The water-soluble source compound for chromate ion can be chromic acid anhydride, chromic acid, and alkali metal salts of chromic acid. The presence of chromate ion serves two principal functions. Chromate ion in the aqueous concentrate functions as a can corrosion inhibitor which permits packaging of the concentrate in ordinary containers fabricated from tincoated sheet steel and it advantageously supplements the anti-corrosion activity of the borate salts. A concentration of chromate ion source material which provides from .1% to 1.0% preferably .2% to .5%, of chromate ion based on the weight of the aqueous concentrate is adequate for the indicated functioning.

The castor oil can be any of the ordinary commercial grades such as those conforming with Federal Specification JJJ–C–86 Grade 3 and the more refined grades including such grades known as Crystal Grade and Castor Oil CP#1.

A concentration of castor oil as low as 3% in the aqueous emulsion concentrate provides adequate lubricant in the automobile cooling system when the concentrate is diluted 60 fold with aqueous heat-exchange liquid. Up to 20% of castor oil can be stably dispersed in the composition with the aid of the self-emulsifying ester. At this concentration and 20 fold dilution of the emulsion concentrate, the resulting conditioned heat-exchange fluid contains 1% of dispersed castor oil plus from .25% to .4% of the ricinoleate ester, a concentration significantly in excess of that ordinary functioning as a fully adequate lubricant. Although no harmful effects are detected as result of the presence of dispersed castor oil and ester at this concentration, a film of excess lubricant is frequently observed in the radiator at the filler spout. A concentration from 6% to 16% castor oil plus the proportionate amount of self-emulsifying ricinoleate ester represents a practical range of lubricant.

The invention aqueous emulsion concentrates are adequately stable without the presence of conventional emulsifiers. Ordinarily, minor proportions of ionic emulsifiers and non-ionic surfactants are ineffective in combination with the castor oil and the self-emulsifying ricinoleate ester toward further improving the stability of the aqueous emulsion. However, the presence of a minor proportion of sulfonated castor oil commonly known as Turkey Red Oil is recognized to promote an improvement when the concentration of castor oil is about 15% or higher. A concentration of from .3% to 3% of Turkey Red Oil based on the weight of the castor oil is effective and about .5% of this auxiliary emulsifier based on the total weight of the emulsion product is a practical maximum.

The aqueous emulsion concentrate can contain other optional adjuvants such as soluble dyes for identification purposes, soluble odorants if it is desirable to mask the odor of the castor oil, and auxiliary inhibitors, such as mercaptobenzothiazole at ordinary proportions which generally are a fraction of one percent.

The following examples serve to illustrate preferred embodiments of the invention. All percentages and parts are expressed on a weight basis unless otherwise designated.

*Example 1*

| | Percent |
|---|---|
| First portion: | |
| Water | 65.6 |
| Chromic acid anhydride | .3 |
| Potassium hydroxide—85% | 6.3 |
| Orthoboric acid—99.5% | 7.5 |
| Second portion: | |
| Self-emulsifying complex ricinoleate ester | 4.3 |
| Castor oil—Grade No. 3 | 16.0 |
| | 100.00 |

The ricinoleate ester was Polyethylene Glycol 400(Di-Tri) Ricinoleate.

The components of the first portion were mixed to dissolve the solid components and to form the potassium salts of the boric acid and the chromic acid. The components of the second portion were added to the aqueous solution of the first portion reaction products and mixed until a uniform dispersion of an oil phase in the aqueous solution of electrolyte salt was formed. The components of the second portion were premixed prior to the addition to the first portion, but the components can be separately added, the order of addition not being significantly critical.

The reaction product salts of the first portion correspond to .6% $K_2CrO_4$ and 8.5% of a mixture of potassium metaborate and potassium tetraborate based on the total weight of the final product.

Example 2

First portion: | Percent
--- | ---
Water | 63.32
Potassium hydroxide—85% | 6.3
Orthoboric acid—99.5% | 7.5
Chromic acid anhydride | .3
Water soluble green dye | .02
Second portion: |
Self-emulsifying complex ricinoleate ester | 6.4
Turkey Red oil | .16
Castor oil—Grade No. 3 | 16.0
| 100.00

The green dye was "Pontacyl" Green BLX conc.

The complex ricinoleate ester was the same as used in the composition of Example 1.

Mixing and combining of the two portions was the same as described for Example 1. If desired, the water-soluble green dye can be withheld from the first portion and finally added to the preformed aqueous emulsion. The Turkey Red oil, being a soluble oil, can be included in the first portion, if desired.

Example 3

First portion: | Percent
--- | ---
Water | 77.5
Potassium hydroxide—85% | 4.7
Orthoboric acid—99.5% | 6.1
Potassium chromate | .5
Second portion: |
Self-emulsifying complex ricinoleate ester | 3.2
Castor oil—crystal grade | 8.0
| 100.00

The complex ricinoleate ester was the esterification product of 2.5 mols of ricinoleic acid and 1 mol of Polyethylene Glycol 300, a polyoxyethylene glycol having an average molecular weight of about 300.

Example 4

First portion: | Percent
--- | ---
Water | 69.6
Potassium tetraborate pentahydrate | 11.1
Potassium hydorxide—85% | 2.7
Potassium dichromate | 0.3
Second portion: |
Self-emulsifying ester-polyethylene glycol 400 (di-tri) ricinoleate | 4.0
Castor oil | 12.0
| 100.00

The combination of the indicated amounts of the tetraborate pentahydrate and the potassium hydroxide corresponds to about 9.9% of potassium borate salts having the approximate composition of 3.2% potassium tetraborate, $K_2B_4O_7$, and 6.7% of potassium metaborate, $K_2B_2O_4$. The potassium hydroxide in the above composition can be replaced with an equivalent weight of sodium hydroxide, the resulting water-soluble electrolyte salts in the composition being a mixture of potassium and sodium salts.

The above described aqueous emulsion concentrates were evaluated for anti-corrosion activity and for attack on rubber parts found in contact with the heat-exchange liquid in the cooling system of an automobile in comparison with the following representative control product containing mineral oil as the lubricant and in comparison with water as a second control.

CONTROL

| | |
--- | ---
Water | 66.9
Potassium hydroxide—85% | 6.3
Orthoboric acid 99.5% | 7.5
Chromic acid anhydride | 0.3
Neutral petroleum oil | 16.0
Turkey Red oil | 1.0
Oil-soluble non-ionic emulsifier | 2.0
| 100.0

The non-ionic emulsifier was an oil-soluble higher alkylphenoxy polyoxyethylene ethanol having an average of about 6 oxyethylene groups per molecule. Emulsifier 153H supplied by General Aniline and Film Corp. is representative of this type of useful emulsifier.

In carrying out the tests, 12 fluid ounces of the control and the respective emulsion products of Examples 1, 2, and 4 were diluted with water to a total volume of 16 quarts. The product of Example 3 was diluted in the proportion of one pint, 16 fluid ounces, to a final volume of 16 quarts.

The corrosion test, designed to simulate operating conditions of an automobile cooling system, consisted of immersing weighed metal slugs of about one square inch of surface area in the respective dilute aqueous compositions maintained at 170° F. and aerated by bubbling air through the liquid and after 5 days reweighing the slugs to determined the corrosion. The results are expressed as mils of corrosion penetration by the following equation:

$$\text{Penetration} = \frac{\text{Wt. Loss in grams} \times 365 \times 1000}{\text{Days Immersion} \times 2.54 \times \text{Metal Density} \times \text{Metal Surface Area}}$$

The various metal slugs were in electroconductive contact as they exist in the automobile. For example, one combination representing the engine block consisted of cast iron, copper and aluminum slugs in electrical contact. The water pump system was represented by a combination of steel and cast iron slugs and the radiator system was represented by a combination of brass, copper and 50/50 lead/tin solder slugs.

The anti-corrosion activity of the diluted invention products was equivalent to that of the diluted control containing mineral oil. Typical penetration results in comparison with water containing no inhibitors is as follows:

| | Example 1 | Water |
--- | --- | ---
Engine Block: | |
  Cast Iron | 0.4 | 21.0
  Copper | +1.0 | +0.5
  Aluminum | +2.5 | 5.5
Water Pump: | |
  Steel | 0.3 | 1.0
  Cast Iron | 0.6 | 22.5
Radiator: | |
  Brass | 0.2 | +0.3
  Copper | 0.0 | +0.5
  Solder | 1.0 | 8.2

Plus values (+) represent a corrosion weight increase in comparison with a corrosion loss.

Representative rubber specimens of Buna S rubber and reclaimed rubber were immersed in the inhibitor compositions at the recommended dilution and examined after 70 hours exposure to the liquid at 165° F. The following table shows the rubber swelling in the respective compositions.

| | Buna S Rubber, percent | Reclaim Rubber, percent |
--- | --- | ---
Water—No Inhibitor | 5 | 10
30% Aqueous "Zerex" Glycol Anti-Freeze | 6 | 8
Example 1 (Castor Oil) | 11 | 15
Control (Mineral Oil) | 17 | 23
Commercial Product #1 (Mineral Oil) | 19 | 22
Commercial Product #2 (Mineral Oil) | 14 | 19

Of these tested respective rubber specimens, only those immersed in water, the aqueous anti-freeze composition and in the water conditioned with the invention inhibitor compositions showed no softening effect on the rubber. These specimens on drying exhibited the original stiffness and flexibility. The specimens immersed in the water in the presence of the mineral oil-containing inhibitor compositions remained in an oil-softened state.

In practical circulator tests carried out at 180° F. simulating performance in an automobile cooling system, water and aqueous alcoholic and glycol anti-freeze compositions conditioned with the invention inhibitor compositions containing castor oil and the self-emulsifying complex ricinoleate ester as the lubricant caused no softening or tendering of the exposed rubber parts. Under the same conditions, Commercial Products #1 and #2 containing mineral oil exhibited significant softening and tendering of the rubber parts, the control containing mineral oil was slightly better than the two commercial products.

A further advantage of the invention composition is that it is non-foaming in use. The control containing the mineral oil is substantially non-foaming, but the Commercial Compositions #1 and #2 exhibit significant foaming which can cause significant loss of heat-exchange liquid from the automobile cooling system during operation.

It is apparent that many widely different embodiments of the invention may be made without departing from the spirit and scope thereof and, therefore, it is not intended to be limited except as indicated in the claims.

I claim:

1. A concentrated aqueous emulsion composition, adapted for 20 to 60 fold aqueous dilution in a circulating liquid cooling system of an internal combustion engine to provide anti-corrosion and anti-acid protection and lubrication, comprising an aqueous phase consisting essentially of (a) water and dissolved therein a corrosion-inhibiting electrolyte salt mixture of (b) from 5% to 12% of alkali metal salts of orthoboric acid and (c) an amount of chromate ion source compound sufficient to provide from .1% to 1.% of $CrO_3$ chromate ion, the sum of $(a)+(b)+(c)$ being at least 72%, and a dispersed oil phase consisting essentially of (d) from 3% to 20% of castor oil and (e) a self-emulsifying oil-soluble liquid complex ricinoleate ester in an amount corresponding to from .25 part to .4 part of said ester per part of said castor oil, said ester being the esterification reaction product of from 2 mols to 3 mols of ricinoleic acid per mol of polyoxyethylene glycol having an average molecular weight of from about 250 to about 500, said percentages being based on the total weight of the composition.

2. The emulsion composition of claim 1 in which said borate salts have a composition corresponding to one mol of $B_2O_3$ and from about .7 mol to about .85 mol of $K_2O$.

3. The emulsion composition of claim 1 which includes from .3% to 3.0% of sulfonated castor oil based on the weight of (d) castor oil, as an auxiliary emulsifier.

4. The emulsion composition of claim 1 in which said ester is the esterification product of polyoxyethylene glycol having an average molecular weight of about 400 and ricinoleic acid.

5. The emulsion composition of claim 1 in which said ester is the esterification product of one mol of polyoxyethylene glycol having an average molecular weight of about 300 and about 2.5 mols of ricinoleic acid.

6. The emulsion product of claim 1 having essentially the following approximate composition:

| | Percent |
|---|---|
| Potassium borate salts | 6 to 10 |
| Chromic acid anhydride | .2 to .5 |
| Ricinoleate ester | 1.5 to 6.4 |
| Castor oil | 6 to 16 |
| Water—Sufficient for the composition to total 100%; | |

Said borate salts having a composition corresponding to a mixture of potassium tetraborate and potassium metaborate analytically equivalent to from .7 mol to .85 mol of $K_2O$ per mol of $B_2O_3$.

7. The emulsion composition of claim 2 in which said borate salt components are present in an amount from 6% to 10% based on the total weight of said emulsion composition.

8. The emulsion product of claim 6 having the following approximate composition:

| | Percent |
|---|---|
| Potassium hydroxide—85% | 6.3 |
| Orthoboric acid | 7.5 |
| Chromic acid anhydride | 0.3 |
| Self-emulsifying oil-soluble ricinoleate ester | 4.3 |
| Castor oil | 16.0 |
| Water | 65.6 |
| | 100.0 | said ricinoleate ester being an esterification product of polyoxyethylene glycol having an average molecular weight of about 400 and ricinoleic acid.

9. The method of preparing an aqueous emulsion concentrate, which on 20 to 60 fold aqueous dilution in a circulating liquid cooling system of an internal combustion engine provides lubrication to the moving parts exposed to said liquid and anti-corrosion protection and alkalinity reserve for anti-acid protection, comprising the steps of forming a solution in water of a mixture of corrosion-inhibiting electrolyte salts consisting essentially of from 5% to 12% of alkali metal salts of orthoboric acid having an analytical composition corresponding to one mol of $B_2O_3$ and from .7 mol to .85 mol of $K_2O$, and an amount of chromate ion source compound sufficient to provide from .1% to 1% of $CrO_3$ chromate ion, the water being in sufficient amount for the resulting aqueous solution to total at least 72% based on the total weight of the emulsion product, and homogeneously dispersing in said aqueous solution as an oil phase from 3% to 20% of castor oil and a self-emulsifying oil-soluble complex ricinoleate ester in an amount from .25 part to .4 part for each part of said castor oil, said ester being the esterification product of from 2 mols to 3 mols of ricinoleic acid per mol of polyoxyethylene glycol having an average molecular weight of from about 250 to about 500.

10. The method of claim 9 in which said borate salts are formed in situ by adding the salt forming components to the water as potassium hydroxide and orthoboric acid.

References Cited in the file of this patent

UNITED STATES PATENTS

| 2,038,988 | Burghart | Apr. 28, 1936 |
| 2,195,689 | Bash | Apr. 2, 1940 |
| 2,233,185 | Smith | Feb. 25, 1941 |
| 2,386,182 | Balcar | Oct. 9, 1945 |
| 2,386,183 | Balcar | Oct. 9, 1945 |
| 2,478,756 | Elder | Aug. 9, 1949 |
| 2,566,923 | Burghart | Sept. 4, 1951 |

FOREIGN PATENTS

| 759,258 | Great Britain | Oct. 17, 1956 |

OTHER REFERENCES

"Esters by Glycols," Glycol Products Co., Brooklyn, N.Y., January 1954, pp. 13 to 18.